United States Patent [19]

Walter

[11] 4,175,995

[45] Nov. 27, 1979

[54] PROCESS OF PRODUCING A DEEP-DRAWN CONTAINER

[75] Inventor: Kurt Walter, Glauburg, Fed. Rep. of Germany

[73] Assignee: Hassia Verpackung GmbH, Ranstadt, Fed. Rep. of Germany

[21] Appl. No.: 831,846

[22] Filed: Sep. 9, 1977

[30] Foreign Application Priority Data

Sep. 21, 1976 [DE] Fed. Rep. of Germany ....... 2642366

[51] Int. Cl.$^2$ ............................................. B29C 17/03
[52] U.S. Cl. ................................... 156/285; 156/287; 156/293; 229/1.5 B
[58] Field of Search ............... 156/245, 285, 287, 293, 156/294; 53/26, 29, 170, 172; 264/88, 93, 129, 132, 134, 135; 229/1.5 B; 425/388, 443, 504

[56] References Cited

U.S. PATENT DOCUMENTS

| | | | |
|---|---|---|---|
| 3,396,062 | 8/1968 | White | 264/93 |
| 3,533,135 | 10/1970 | Christensson | 425/504 |
| 3,620,871 | 11/1971 | Benson-Petersen | 156/245 |

Primary Examiner—Caleb Weston
Attorney, Agent, or Firm—Posnack, Roberts, Cohen & Spiecens

[57] ABSTRACT

Processes are disclosed for forming containers having the complete outer surfaces decorated and the bottom surface reinforced as well. In one embodiment a banderole is placed in a deep-drawing mold and length of drawable foil having a bottom blank secured thereto is fed to the mold. In a second embodiment the bottom blank is placed in the mold, together with the banderole prior to the feeding of the drawable foil. Pleating of the peripheral edge of the bottom blank prevents covering of the suction openings in the deep-drawing mold.

8 Claims, 10 Drawing Figures

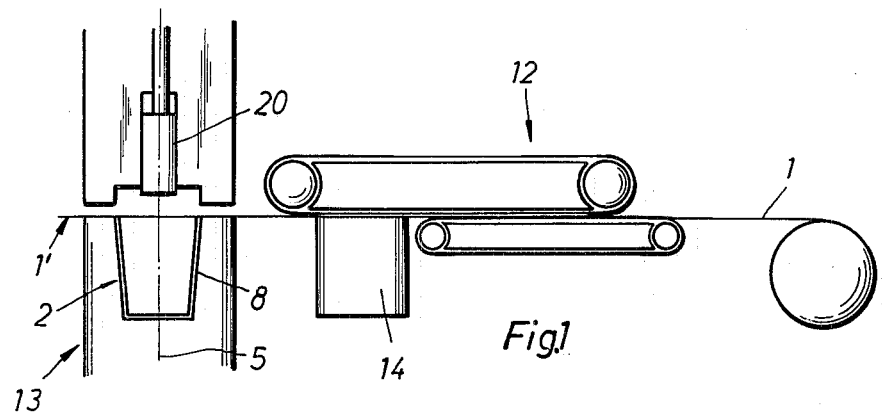
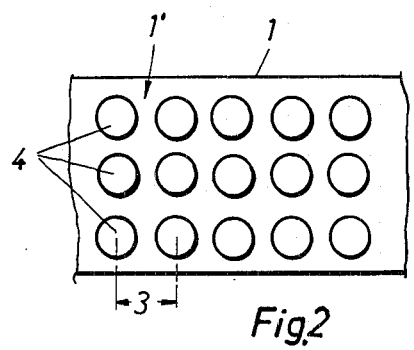
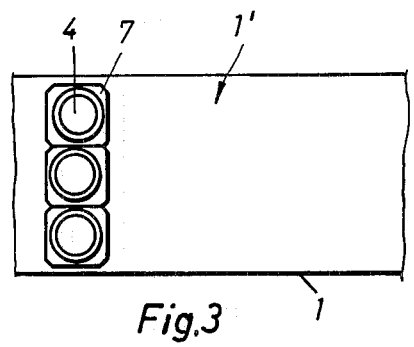
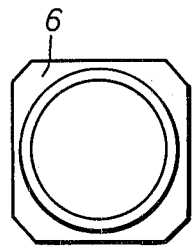
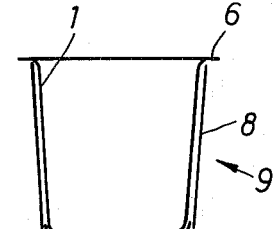
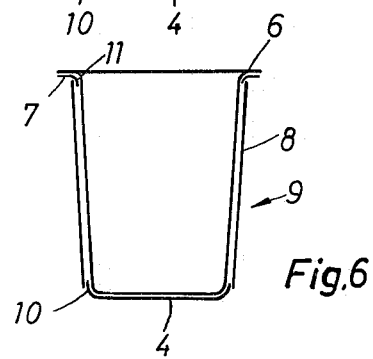

PROCESS OF PRODUCING A DEEP-DRAWN CONTAINER

BACKGROUND OF THE INVENTION

1. Field of the Invention

The present invention relates generally to a process for producing deep-drawn containers and, more particularly, to a process for producing deep-drawn containers in the form of cups, pans or the like, which are formed of two material components.

2. Description of the Prior Art

Deep-drawn containers made from deep-drawable plastic foils, especially in the form of cups for packaging food, such as yogurt, cottage cheese, and other milk products and also ready-to-serve dishes or the like, are generally known. It is also known, depending on the desired make-up of the packaging, for example according to DAS No. 2,065,713, to introduce prior to deep-drawing in the deep-drawing mold a banderole with legends and/or illustrative pictures and to seal them at the same time. After filling, such deep-drawn packagings are covered with a metal foil.

The bottom area of the cups or containers is excluded from this operation in the prior art process so that this area which, as a rule, because of the special character of the deep-drawing operation, is formed especially thin, remains unreinforced and is not very stable. Since the bottom remains uncovered, an overhead display arrangement of the goods cannot be considered as there is no "all-around-decoration."

Basic to the present invention is the problem of providing a process by way of which the outer surface of the container can be completely covered, i.e. especially the bottom area, it being an object of this invention to permit, by way of such a process, the production of deep-drawn containers having a circumferentially applied thin aluminum foil which otherwise is no longer deep-drawable. The process of the present invention, as well as the product made thereby, has been desired for some time because the prior art deep-drawn plastic packages do not comply with the requirements for an absolute tightness relative to flavor, water vapor, oxygen and light, thereby limiting the storage stability of food packed therein. Packages in line with these requirements, it is true, are known. However, they have been drawn from a relatively thick aluminum foil, thus involving a substantial mechanical expenditure and with the depth of such container being relatively shallow.

The problem is solved according to the present invention by means of a process of the aforementioned type in that connected to the deep-drawable component, prior to the introduction thereof into the deep-drawing mold and at intervals corresponding to the feeding cycle, there is provided a bottom blank corresponding to the bottom shape of the container to be produced but of slightly larger dimensions. The bottom blanks may be made, for example, of a thin, non-deep-drawable aluminum foil and are secured to the deep-drawable component from the bottom by heat sealing. During introduction of the deep-drawable component into the deep-drawing mold the bottom blanks, with the adhesive still hot, are placed precisely in the center of the mold and the bottom blank during deep-drawing in the deep-drawing mold is held from the bottom, for example by means of a die.

In this manner, first a "roundabout decoration" and also a reinforcement of the bottom area can be achieved, with the problem of covering the suction opening in the deep-drawing mold, which would arise if the bottom blank were simply placed into the mold being avoided and solved in a most simple manner.

Conversely, this process permits, when using for the components to be cemented, i.e. a side wall banderole and a bottom blank, a thin aluminum foil, to produce deep-drawn containers complying with all tightness requirements, especially cups of a substantial depth, which hitherto, has not been possible.

The problem of covering the suction opening can also be solved differently. In addition to the banderole a bottom blank, the edge of which prior to insertion is radially folded and bent upwardly, is inserted into the deep-drawing mold so that the bottom edge of the banderole is positioned between the upwardly bent edge and the mold wall.

Through the radial folding venting openings are provided between the banderole and the inserted bottom blank through which the drawn off air can escape. This process variant provides the additional advantage that the upwardly bent and pre-folded edge better abuts to the bottom banderole rim and establishes a connection therewith.

Concerning the covering of the upper gusset or flange of the container, the two modes of operation may be so carried out that the blank web and the bottom blanks are heat sealed to the deep-drawable component and are introduced along therewith into the deep-drawing mold.

With respect to the product produced according to the process of this invention it should be noted that for protection the side wall banderole of the deep-drawn container covers the rim bent upwardly during deep-drawing of the bottom blank and which was heat sealed prior to deep-drawing and is heat sealed therewith. Furthermore, the side wall banderole of the deep-drawn container covers the rim bent dowardly during deep-drawing of the concentrial edge blank or ring-like member and is heat sealed therewith.

The apparatus for carrying into effect the process and for the preparatory production of the deep-drawing foil, respectively, is most simple and can either be associated in a suitable manner to the deep-drawing machine or can be operated independently thereof. However, in the latter case, the component blanks must precisely correspond to the working and intake cycle of the deep-drawing machine to which the latter are applied.

In principle, such an apparatus is a punch combined with means to cyclically sealing the blanks with heat sealing adhesive on or to the deep-drawing foil.

The process of the invention, the container produced according thereto and an apparatus for carrying into effect the process will now be described with reference to the graphic illustration of examples of several embodiments.

BRIEF DESCRIPTION OF THE DRAWINGS

FIG. 1 is a schematic side view of a deep-drawing apparatus that may be used with the process comprising the present invention;

FIGS. 2 and 3 are plan views of the deep-drawable components in the form of a plastic foil;

FIG. 4 is a plan view of a cup formed in accordance with the process of the present invention;

FIG. 5 is a schematic sectional elevational view of a cup formed according to the invention;

FIG. 6 is a schematic sectional elevational view, similar to FIG. 5, of another embodiment of the present invention;

DESCRIPTION OF THE PREFERRED EMBODIMENTS

Figure 7:
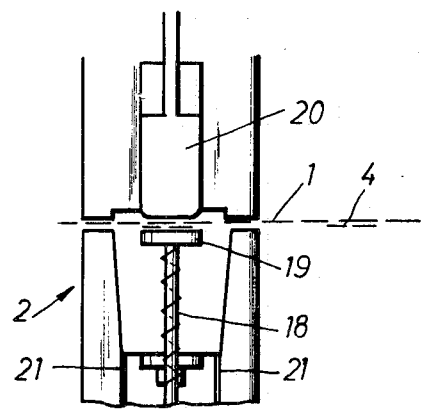
FIG. 7 is a fragmentary, schematic sectional view, in elevation, of a special formation of the deep-drawing mold.

Referring now to the drawings, numeral 1 refers to the deep-drawable component to be withdrawn from a stock roll, reference character 2 refers to a very simplified and schematic illustration of the deep-drawing mold for molding the containers, numeral 3 refers to the spaces at which the bottom blanks (for example of aluminum foil) corresponding to the bottom shape of the container are cemented to the component 1 to the bottom of the blank web 1', and reference character 5 refers to the mold center-line of the deep-drawing mold 2.

The apparatus need not necessarily be arranged in the precise manner as illustrated. It can also be provided at the right-hand side beside the bottom transport element then shifted toward the left-hand side, quite apart from the fact that, as set forth above, the punching apparatus 14 can also be operated independently of the deep-drawing apparatus, which is generally designated by the reference character 13, in which case the fully prepared foil web will be applied to the deep-drawing apparatus.

As has been found, the foil during deep-drawing of the deep-drawable component 1 readily expands from the regions to which bottom blanks are cemented as the still hot adhesive permits such an expansion of the foil.

During deep-drawing, also in a known manner, a banderole 8 for the side wall that is inserted into the deep-drawing mold 2 is sealed, with the upwardly bent rim 10 of the bottom blank 4 being covered by the lower rim of the banderole 8, as shown in FIGS. 5 and 6. According to FIG. 6 also the area below the less critical container edge 6 may be covered by a corresponding ring-shaped blank 7 which is cemented onto the blank web 1' in the form of a corresponding blank concentrically to the blank 4. The rim 11 of the ring-shaped blank 7, which is bent downwardly during deep-drawing, is then covered by the banderole 8. After filling of the containers 9 according to FIGS. 5 and 6, the containers 9 may then be covered in a known manner with an aluminum foil (not shown).

The components to be applied to the container surfaces, i.e. the banderole 8, are preferably provided with a slight surface stamping or irregularity in a well-known manner so that air that may be entrapped during deep-drawing may be better removed. If the blanks 4 and 7 and the banderole 8 are made of an aluminum foil, the resultant containers 9 are tight in all respects so that for the first time deep-drawn containers of an extremely thin aluminum foil (approximately 0.03 mm thick), supported by a plastic base container, are available.

To meet the eventuality that the bottom blanks 4 are slightly displaced during deep-drawing, which might occur, the deep-drawing mold, which may be of the type shown in U.S. Pat. No. 3,533,135, may be so formed that in the bottom part, such as is shown in FIG. 7, a ram 18 that is movable up and down is provided in an upper plate 19 for fixing the blanks 4 with the ram 18 being pushed downwardly by a pre-drawing die 20 during deep-drawing.

Figure 8:
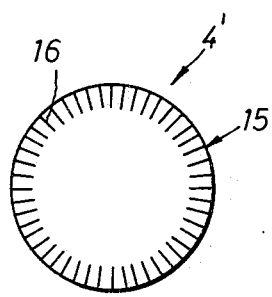
FIG. 8 is a plan view of a special bottom blank.
Figure 9:
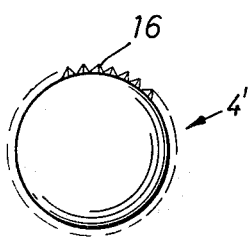
FIG. 9 is a plan view of the bottom blank according to FIG. 8 with an upwardly bent rim.

As previously mentioned, the process of this invention may also be so carried into effect that the bottom blank is not inserted together with the deep-drawable component 1 into the deep-drawing mold 2 but is rather inserted beforehand with suitable elements. In order not to block the suction openings 21 of the deep-drawing mold 2, a bottom blank 4', such as shown in FIGS. 8 and 9, is provided with radial small pleatings at 16 at the edge 15 thereof. The pleatings 16 may be formed by bending the circumferential edge 15 upwardly. These pleatings 16 provide adequate air passage means so that the reduced pressure caused by the suction openings 21 can also be effective within the banderole 8 and the bottom blank 4'.

Figure 10:
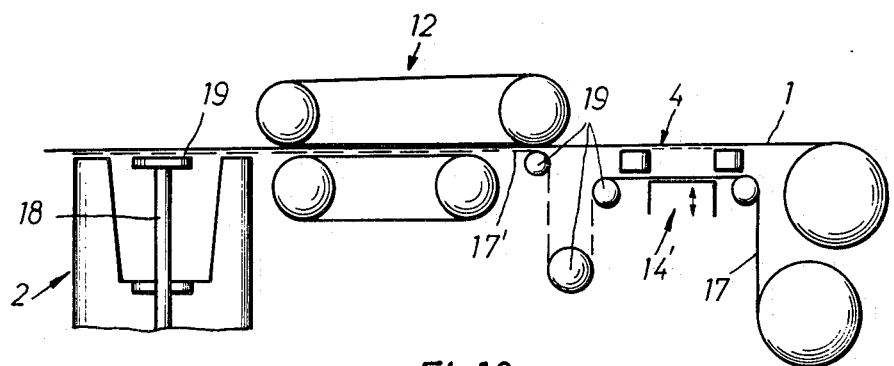
FIG. 10 is another embodiment of the entire apparatus.

An apparatus applicable to both processes, by way of which a punched foil web 17' is introduced as a whole along with the deep-drawable component 1 into the deep-drawing mold 2, is illustrated in FIG. 10. In the FIG. 10 embodiment bottom blanks 4 are introduced along with the deep-drawable component 1. The punching means 14' punches the bottom blanks 4 and presses them, from the bottom, against the component 1. The remaining punched foil 17' is then fed, by means of foil tape supplying elements 19, to the component 1 in such a manner that the punched openings are disposed concentrically to the blanks 4.

In case the bottom blanks 4' pleated at 16 are directly placed into the deep-drawing mold 2, which would then not require foil tape supplying elements 19, the punching means 14' would be eliminated at the indicated point. The punched remaining foil 17' will, of course, have to be introduced in the working cycle of the deep-drawing mold relative to the punching holes thereof.

What is claimed is:

1. A process for the production of deep-drawn containers in the form of cups, pans or the like which containers are adapted to be covered with a material such as a metal foil after filling, said process comprising the steps of:
    (a) positioning a banderole in a deep-drawing mold on the side wall thereof;
    (b) positioning a bottom blank in the deep-drawing mold on the bottom wall thereof in such a manner as to permit suction from said mold between said banderole and bottom blank;
    (c) feeding a length of thermo-deformable material to the deep-drawing mold;
    (d) deep-drawing the thermo-deformable material;
    (e) locating the lower edge of the banderole so that it will be in overlapping relationship with the peripheral edge of the bottom blank after the container is formed and,
    (f) securing the banderole and the bottom blank to the external side and bottom wall surface of the deep-drawn, thermo-deformable material.

2. The process according to claim 1 further including the step of holding the bottom blank on the central axis of the deep-drawing mold and at the bottom thereof during said deep-drawing step.

3. The process according to claim 1 wherein said securing step comprises applying heat.

4. The process according to claim 1 wherein the suction is permitted by turning the peripheral edge of the bottom blank upwardly and pleating the upturned edge.

5. The process according to claim 1 wherein the deep-drawn container includes a laterally extending flange at the open, upper end thereof and further including the step of attaching a ring-like member to the underside of the flange, the ring-like member also including an inner end portion positioned about the side wall of the deep-drawn container.

6. The process according to claim 5 further including the step of locating the upper edge of the banderole in overlapping relationship with the inner end portion of the ring-like member.

7. A process for the production of deep-drawn containers in the form of cups, pans or the like which containers have a laterally extending flange at the open, upper end thereof and are adapted to be covered with a material such as a metal foil after filling, said process comprising the steps of:

(a) positioning a banderole in a deep-drawing mold on the side wall thereof;
(b) attaching a bottom blank to a length of thermo-deformable material;
(c) feeding the thermo-deformable material and the bottom blank to the deep-drawing mold;
(d) deep-drawing the thermo-deformable material;
(e) prior to the deep drawing of said thermo-deformable material, attaching a ring-like member to the underside of the thermo-deformable material in concentric relation to said blank, the ring-like member also including an inner end portion positioned about the side wall of the deep-drawn container and,
(f) securing the banderole and the blank to the external side and bottom wall surfaces of the deep-drawn thermo-deformable material.

8. The process according to claim 7 further including the step of locating the upper edge of the banderole in overlapping relationship with the inner end portion of the ring-like member.

* * * * *